(12) United States Patent
Virk et al.

(10) Patent No.: US 10,114,524 B2
(45) Date of Patent: Oct. 30, 2018

(54) GRAPHICAL USER INTERFACE FOR SWAPPABLE ITEM SELECTION

(71) Applicant: GOOGLE INC., Mountain View, CA (US)

(72) Inventors: Adnan Virk, Fremont, CA (US); Beverly Tseng Yen Chieh Freeman, San Jose, CA (US); Siddhartha Parmar, Sunnyvale, CA (US); Claire Evelyn Balgemann, San Jose, CA (US); David Michael Renie, Menlo Park, CA (US); Charmaigne Lu, Redwood City, CA (US); David Marcin, Sunnyvale, CA (US); Nicolas Fernando Cabrera, Menlo Park, CA (US); Dhruv Manek, Milpitas, CA (US)

(73) Assignee: GOOGLE LLC, Mountain View, CA (US)

( * ) Notice: Subject to any disclaimer, the term of this patent is extended or adjusted under 35 U.S.C. 154(b) by 315 days.

(21) Appl. No.: 14/986,649

(22) Filed: Jan. 1, 2016

(65) Prior Publication Data

US 2017/0192626 A1 Jul. 6, 2017

(51) Int. Cl.
| | | |
|---|---|---|
| *G06F 3/048* | (2013.01) | |
| *G06F 3/0482* | (2013.01) | |
| *G06F 3/0485* | (2013.01) | |
| *G06F 3/0481* | (2013.01) | |
| *G06Q 30/06* | (2012.01) | |
| *G06F 3/0488* | (2013.01) | |
| *G06F 3/0484* | (2013.01) | |

(52) U.S. Cl.
CPC .......... *G06F 3/0482* (2013.01); *G06F 3/0485* (2013.01); *G06F 3/0488* (2013.01); *G06F 3/04817* (2013.01); *G06F 3/04842* (2013.01); *G06Q 30/0643* (2013.01)

(58) Field of Classification Search
CPC .. G06F 3/0482; G06F 3/04817; G06F 3/0485; G06Q 30/0643
See application file for complete search history.

(56) References Cited

U.S. PATENT DOCUMENTS

| | | | | |
|---|---|---|---|---|
| 2009/0172090 A1* | 7/2009 | Lit | ........................ | G06F 3/0481 709/203 |
| 2012/0045188 A1* | 2/2012 | Sasaki | ................... | G06F 3/0482 386/230 |

* cited by examiner

*Primary Examiner* — Jeffrey A Gaffin
*Assistant Examiner* — Ayesha Huertas Torres
(74) *Attorney, Agent, or Firm* — Johnson, Marcou & Isaacs, LLC (57) ABSTRACT

Providing, by operation of a computer, instructions causing a user computing device to present a carousel graphical user interface. The carousel graphical user interface includes a carousel region occupying less than all the display area of the user computing device and comprising multiple frames. Each frame is sized such that at least one, and less than all, of the frames are displayed simultaneously in the carousel region. Each frame is operable to receive selection via an input to the carousel graphical user interface of the user computing device. At least one frame includes content indicating an item from a set of one or more second items available for delivery; each second item in the set being swappable with a first item corresponding to a first item identifier of an order. The carousel region is navigable via user input to the graphical user interface to display each frame in the plurality of frames.

20 Claims, 10 Drawing Sheets

GRAPHICAL USER INTERFACE FOR SWAPPABLE ITEM SELECTION

TECHNICAL FIELD

The disclosed technology relates to a user interface (UI) to present item swap options to a consumer and to receive item swap option selections from the consumer via a mobile computing device of the consumer.

BACKGROUND

"Electronic commerce" and "e-commerce," refer to buying and selling, and, in some instances, online delivery, of goods or services (hereinafter referred to as "items") enabled at least in part by electronic systems such as the Internet. Specifically, "online retailing" can be used when referring to business-to-consumer (B2C) e-commerce. Most online retailing involves item selection, ordering, and payment via a web browser, then order fulfillment, and finally delivery by conventional delivery services. Typically, the consumer is willing to incur a short delay in fulfillment (often on the order of a day or two), and a delay in delivery.

Typical delivery times are 3-5 business days (or longer if free delivery is selected), with shorter delivery times available for a premium. Delivery options include downloading (for software items), direct shipping from the online retailer, drop shipping (by-passing the online retailer's location and shipping the item directly from a manufacturer or distributor), and printing or will-call (used primarily for tickets).

If the typical fulfillment and delivery latency is acceptable, then the location of the merchant typically does not matter to the consumer if delivery costs are relatively low. But in circumstances where one or more of the merchant location and delivery speed matter to the consumer, local online shopping may be used.

"Local shopping" when used in online retailing, can refer to activities that include responding to an online item query with the identity of one or more local brick-and-mortar stores that offer the item. The response typically includes store location, item price, item features, and current stocking level at each store location (as known by the online shopping system). Often, the item can be ordered online and picked up at a local brick- and mortar location within a matter of minutes or hours. Alternatively, the user can visit the brick-and-mortar location to buy the item offline after locating the local merchant offering the item and confirming that the item is in stock at that location.

If the consumer wants delivery of a locally stocked item within the near term, for example, the same day as ordering, then the consumer is typically limited to delivery from a single business (for example, pizza delivery and dry cleaning pick up and delivery), limited to delivery by an item category courier (for example, a multi-restaurant delivery service), limited to delivery by a general courier, or limited to the use of errand labor auction services (for example, online errand labor auction service).

SUMMARY

The technology described herein includes computer-implemented methods, computer program products, and systems to operate a user interface for swappable item options. In some embodiments, the technology can provide, by operation of a computer, instructions causing a user computing device to present a carousel graphical user interface. The carousel graphical user interface includes a carousel region occupying less than all the display area of the user computing device and comprising multiple frames. Each frame is sized such that at least one, and less than all, of the frames are displayed simultaneously in the carousel region. Each frame is operable to receive selection via an input to the carousel graphical user interface of the user computing device. At least one frame includes content indicating an item from a set of one or more second items available for delivery; each second item in the set being swappable with a first item corresponding to a first item identifier of an order. The carousel region is navigable via user input to the graphical user interface to display each frame in the plurality of frames.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Providing local online shopping with near-term delivery presents challenges not met by single-business delivery, item category couriers, general couriers, or errand labor auction services. Among those challenges is the fulfillment of orders for items that are at least temporarily out-of-stock (or otherwise unavailable) at the primary inventory site. Given that inventory sites can be brick-and-mortar retail locations without real-time inventory reporting capability, an inventory site's stock of items as reported to a local online shopping service on a periodic, for example, daily, basis may not reflect actual item stock levels. Further, when a mobile computing device is used to interact with the local online shopping service (either through a mobile web browser or a native application), the limited user interface (UI) of the mobile computing device presents a challenge to display options for responding to out-of-stock conditions and receiving feedback. Though a more elaborate UI than that available on a mobile computing device can be presented via a desktop or laptop computing device, efficient use of vertical UI space still can be important. Experience has shown that some consumers have a negative UI experience when interaction requires more than either minimal vertical scrolling or navigation away from the current page—resulting in loss of potential customers.

Technical impediments exist to consumers conducting online shopping on a mobile computing device such as a smartphone. In 2014, the average new smartphone presented a diagonal screen size of less than 5"—including the space available for a keyboard. With such a limited UI, entering long queries and conducting extensive research on a smartphone can be cumbersome for the smartphone user. Such a small UI is not amenable to displaying rich results, for example, search results responsive to broad queries. When combined with the growing fragmented nature of consumers' interaction with smartphones, the technical challenge to presenting useful information across fragmented interactions through a relatively small UI can be substantial.

By using and relying on the methods and systems described herein, embodiments of the disclosed technology can present a UI that offers item swap options to a consumer, and receives item swap feedback via the limited UI of a mobile computing device (and conserving valuable vertical UI space in desktop and laptop computing environments). As such, the systems and methods described herein may be employed to solicit consumer input using a carousel structure that makes efficient use of both horizontal and vertical UI space, and that retains the participation of consumers who would otherwise abandon the purchase process. In embodiments of the present technology, the consumer is not presented with a cumbersome UI that requires vertical scrolling beyond the point at which some consumers would abandon the purchase process when faced with the need to swap an item. Further, the UI can receive item swap preferences without redirection of the user's browser.

Turning now to the drawings, in which like numerals represent like (but not necessarily identical) elements throughout the figures, example embodiments of the present technology are described in detail.

Example System Architectures

Figure 1:
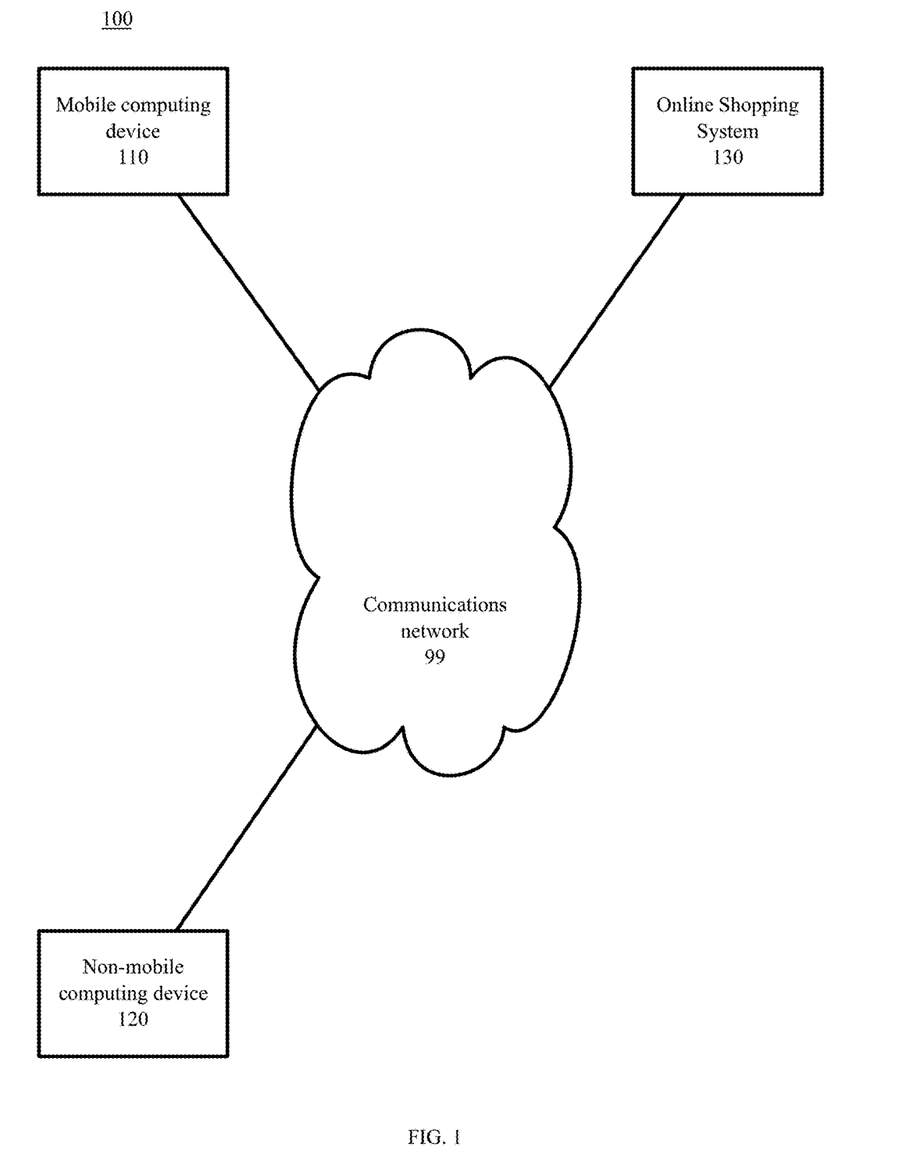
FIG. 1 is a block diagram depicting a communications and processing architecture for presenting a graphical user interface for local online shopping with near term delivery, in accordance with certain example embodiments.

Referring to FIG. 1, an example communication and processing architecture 100 for a UI for local online shopping with near-term delivery is illustrated. While each server, system, and device shown in the architecture is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the architecture 100 includes network computing devices 110, 120, and 130; each of which may be configured to communicate with one another via communications network 99. In some embodiments, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example embodiment depicted in FIG. 1, a local online shopping with near-term delivery service may operate network computing device 130. A consumer may operate network computing device 110 and network computing device 120.

The network connections illustrated are example and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example, consumer device 110 may be embodied as a smartphone or handheld computer may not include all the components described above.

In such an architecture 100, an online shopping system 130 is responsive to item information requests received from a consumer via mobile computing device 110. As a continuing example, consider a consumer using a smartphone 110 to query for a specific detergent brand in an online shopping system 130, via either a web browser or a native application running on the smartphone 110—in each case communicating with the shopping system 130 over network 99.

The online shopping system 130 presents search results responsive to the consumer's query via mobile computing device 110 (or user computing device 120, as appropriate). The online shopping system 130 receives selection of an item for purchase and delivery, for example, from the search results, from the consumer via the mobile computing device 110. In addition, the online shopping system presents a UI to the consumer via the mobile computing device 110 to indicate items that are swappable with the selected item. The UI is presented as a carousel in a region occupying less than all the display area of the user mobile computing device 110. The carousel region displays at least one, and less than all, frames of the carousel, with each frame operable to be selected, and at least one frame displaying information regarding an item swappable for the selected item. The carousel is navigable, via consumer input from mobile user computing device 110, to display each frame in the carousel. Selection of a frame indicates to the online shopping system that the item corresponding to the frame is acceptable as a swap for the originally selected item.

Figure 10:
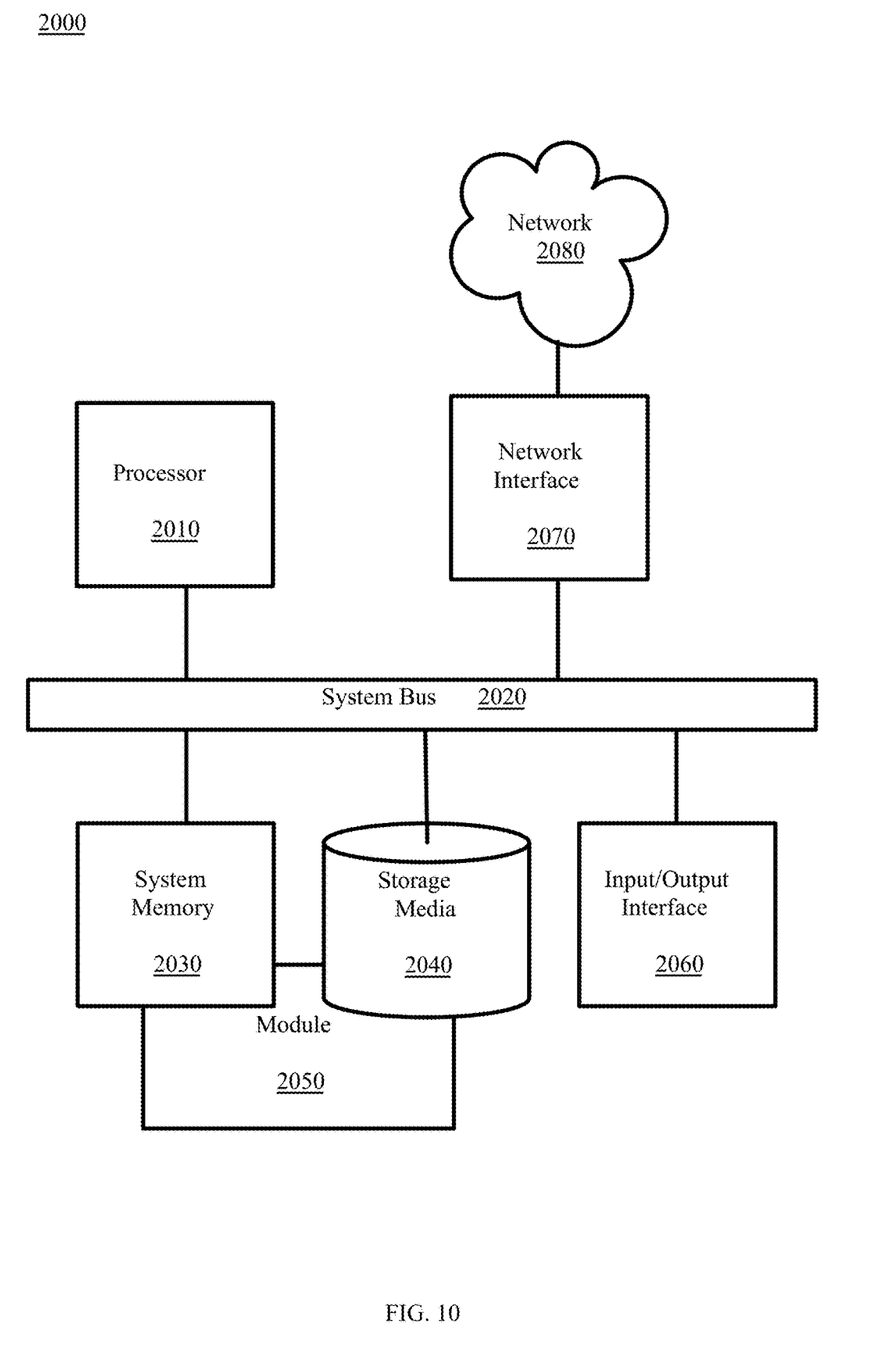
FIG. 10 is a block diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 10. Furthermore, any functions, applications, or modules associated with any of these computing machines, such as those described herein or any others (for example, scripts, web content, software, firmware, or hardware) associated with the technology presented herein may by any of the modules discussed in more detail with respect to FIG. 10. The computing machines discussed herein may communicate with one another, as well as with other computing machines or communication systems over one or more networks, such as network 99. The network 99 may include any type of data or communications network, including any of the network technology discussed with respect to FIG. 10.

Example Processes

The example methods illustrated in the following figures are described hereinafter with respect to the components of the example architecture 100 described elsewhere herein. The example methods may also be performed with other systems and in other environments.

Figure 2:
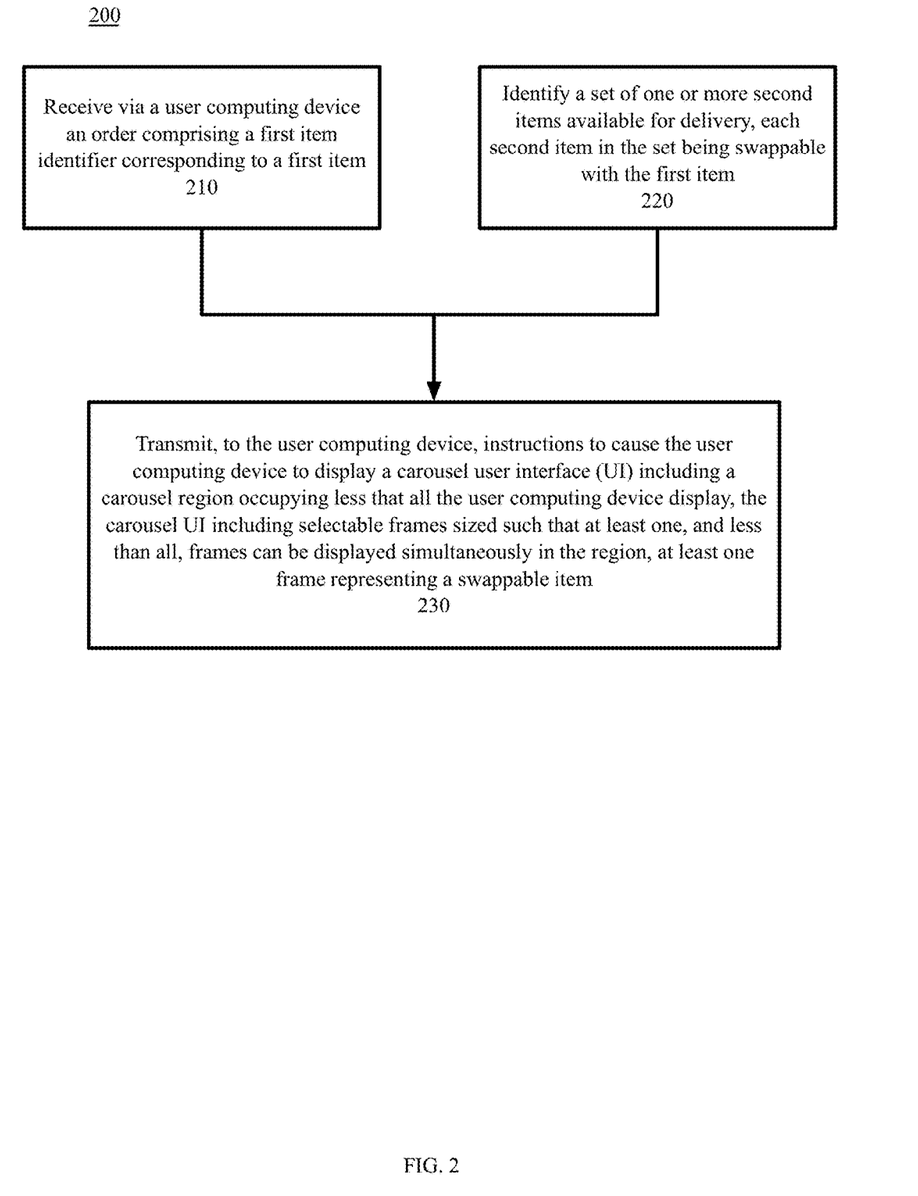
FIG. 2 is a block flow diagram depicting methods to operate a graphical user interface (UI) in a local near term delivery online shopping system, in accordance with certain example embodiments.

Referring to FIG. 2, and continuing to refer to FIG. 1 for context, example methods 200 to operate a UI for swappable item options are shown, in accordance with embodiments of the present technology. In such embodiments, an order including a first item identifier corresponding to a first item is received from a user computing device by an online shopping system—Block 210. Consider, as a continuing example, a consumer selecting a 50 oz. bottle of Brand A Mountain Fresh Scent liquid laundry detergent from a website of an online shopping system 130 via a browser running on the consumer's smartphone 110 over communications network 99.

The online shopping system can identify a set of one or more second items that are available for delivery (for example, are in know or expected to be in stock to meet the temporal aspects of the order)—each second item in the set being swappable with the first item—Block 220. Note that Block 220 can be performed independently from Block 210. For example, signals for each item in inventory of the online shopping system 130 can be used to determine a set of candidate swappable items.

In the continuing example, the online shopping system 130 can use a rule-based system, including any rule-based machine learning system, to identify swappable items based on signals associated with both the selected product and the consumer. Such signals include item name, item size, item category, item physical dimensions, item price, whether or not the selected item is on sale, quantity of the selected item, aggregate user behavior with respect to the item or similar items, and characteristics of the consumer. The list of candidates can be winnowed, or ranked, without reference to an individual consumer.

In the continuing example, the online shopping system 130 identifies the items of TABLE 1 as swappable with the selected 50 oz. bottle of Brand A Mountain Fresh Scent liquid laundry detergent.

TABLE 1

| FRAME REF. | PRODUCT | BRAND | VARIANT | SIZE | PRICE |
|---|---|---|---|---|---|
| 312b | Laundry Detergent | A | Unscented HE | 50 oz. | $18.79 |
| 312c | Laundry Detergent | B | Alpine Scent | 50 oz. | $12.79 |
| 312d | Laundry Detergent | A | Mountain Fresh Scent | 25 oz. | $10.00 |
|  | Laundry Detergent | A | Mountain Fresh Scent | 2 @ 50 oz. | $35.17 |

The online shopping system transmits, to the user computing device, instructions operable to cause the user computing device to display a carousel GUI—Block 230. The carousel UI comprises a carousel region occupying less than all the display area of the user computing device and multiple frames. Each frame is sized such that at least one, and less than all, of the frames can be displayed simultaneously in the carousel region. Each frame is operable to receive selection of the frame via the user computing device. At least one frame includes content indicating an item from the set of one or more second items available for delivery. The carousel region is navigable via user input to display each frame in the multiple frames.

Figure 3:
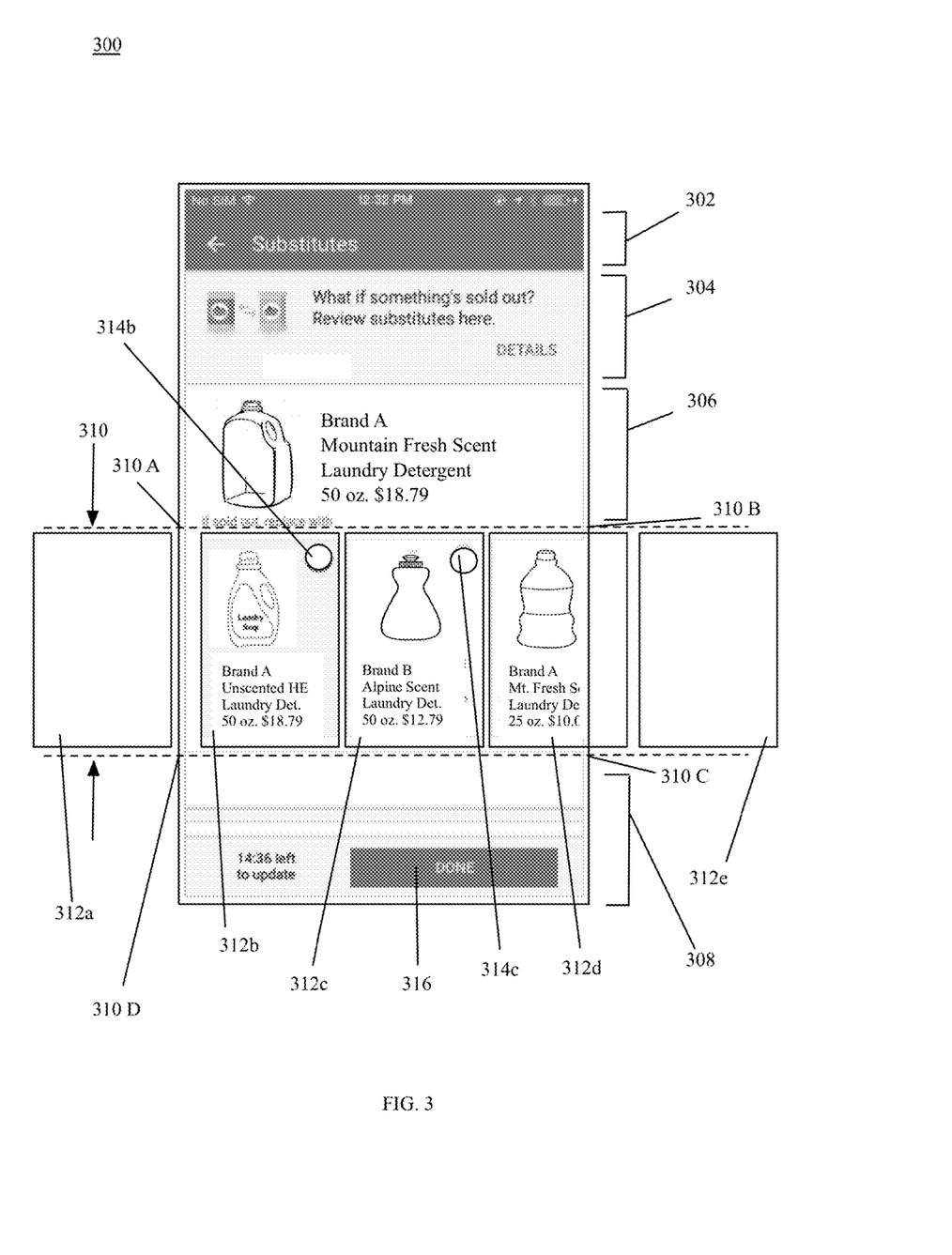
FIG. 3 is a notional UI for a carousel user interface, in accordance with certain example embodiments.

Referring FIG. 3, while continuing to refer to prior figures for context, a carousel user interface 300 appropriate to a smartphone 110 is shown, in accordance with example embodiments of the present invention. In FIG. 3, UI 300 includes a section 302 that indicates that a "Substitutes," or swap options, UI is currently being displayed. UI section 304 includes a "DETAILS" hyperlink to an explanation of the swap options process. UI section 306 identifies the selected item. UI section 308 includes a timer for the swap options UI and a "DONE" radio button 316 selectable when the consumer has completed the swap options process for the selected item. The carousel 310 (between the dashed lines) includes carousel region 310 ABCD occupying less than all the display area of UI 300. The carousel 310 includes multiple frames 312a-312e. Each frame includes information for the item represented by the frame, and a frame selection icon, for example, 314b and 314c. FIG. 3 shows content for only the portion of each frame displayed in carousel region 310 ABCD. In FIG. 3, two frames (312b, 312c) are fully displayed, one frame (312d) is partially displayed (without displaying its selection icon), and two frames (312a, 312d) are not displayed. In the five-frame carousel 310 of FIG. 3, the two 50 oz. Brand A Mountain Fresh Scent laundry detergent identified in TABLE 1 is not presented as an item swap option.

Figure 4:
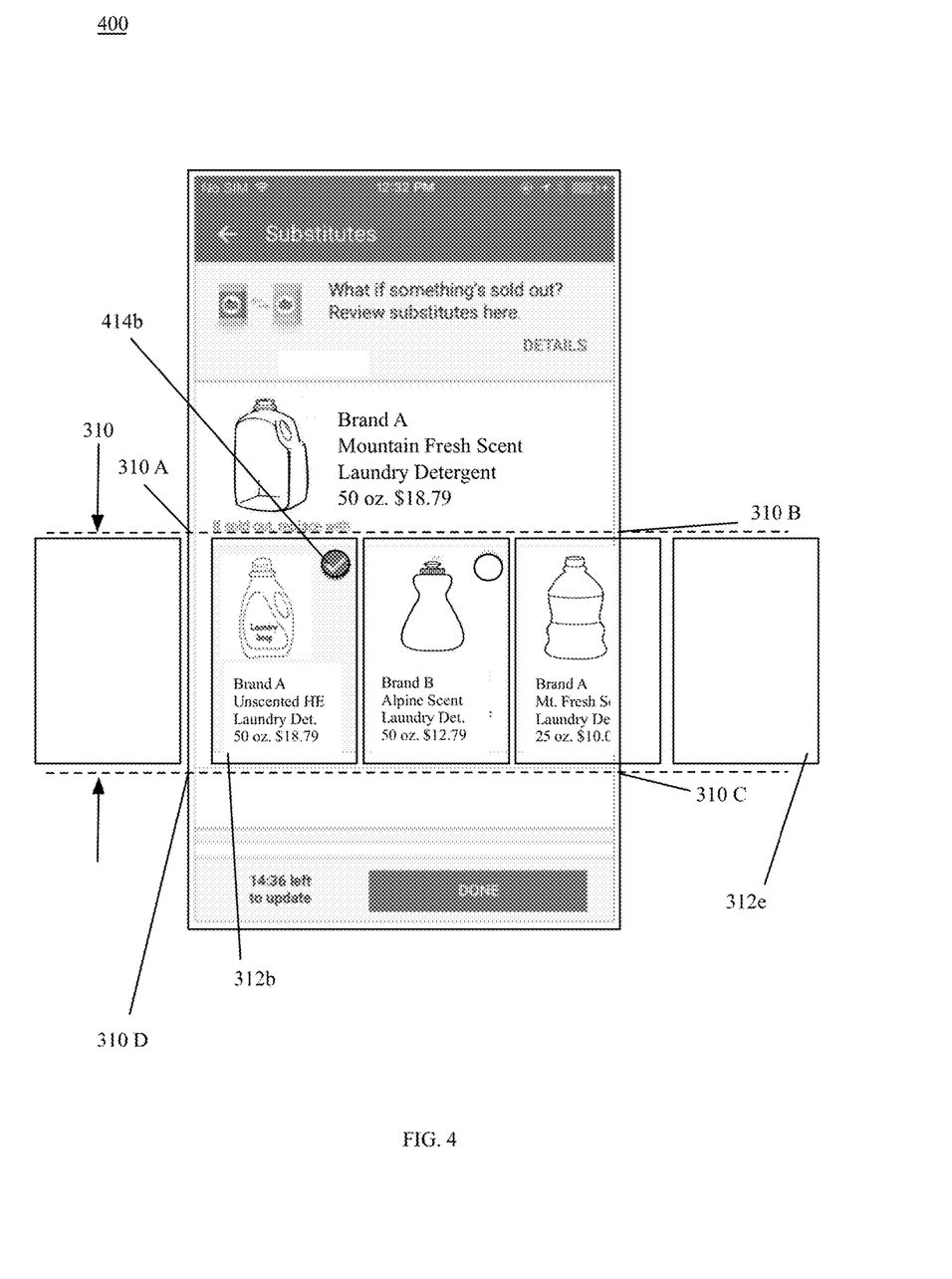
FIG. 4 is a notional UI for a carousel user interface, in accordance with certain example embodiments.

Referring to FIG. 4, while continuing to refer to prior figures for context, a carousel user interface 400 appropriate to a smartphone 110 is shown, in accordance with example embodiments of the present invention. In some embodiments, selection of a frame, for example, 312b, indicates that the item corresponding to the content of the selected frame is acceptable to the user as a swap for the first item. Selection of a frame does not cause navigation of the user computing device away from a page containing the selected frame. In the continuing example, selection of frame 312b is indicated by a checkmark 414b applied by the user via the UI of the mobile computing device 110.

Figure 5:
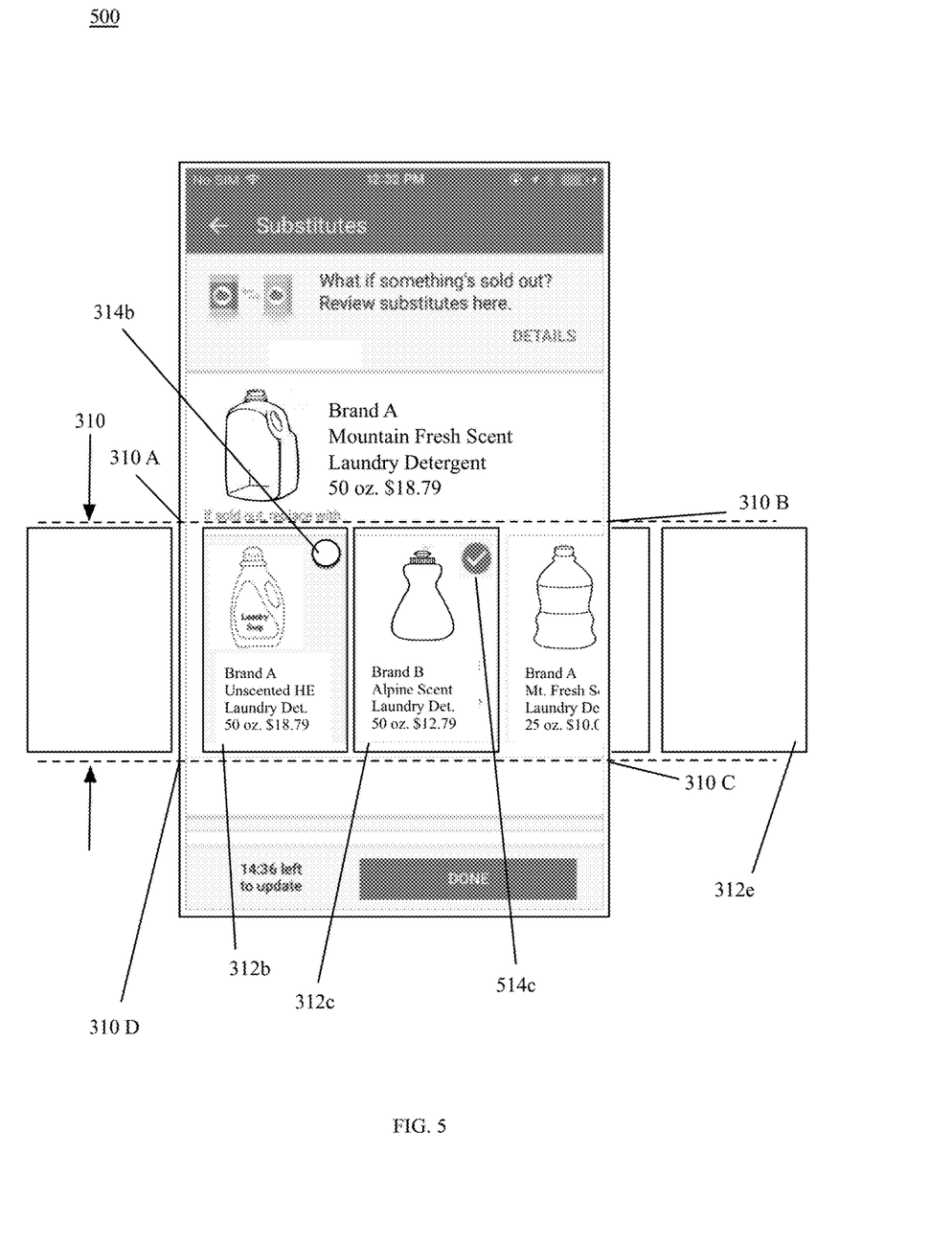
FIG. 5 is a notional UI for a carousel user interface, in accordance with certain example embodiments.

Referring to FIG. 5, while continuing to refer to prior figures for context, a carousel user interface 500 appropriate to a smartphone 110 is shown, in accordance with example embodiments of the present invention. In some embodiments, selection of a frame, for example, 312c, 1) indicates that the item corresponding to the content of the selected frame is acceptable to the user as a swap for the first item, and 2) deselects each other frame in the multiple selectable frames. In the continuing example, selection of frame 312c is indicated by a checkmark 514c applied by the user via the UI of the mobile computing device 110. Note that frame selection icon 314b is now unchecked, indicating that frame 312b was deselected when frame 312c was selected.

Figure 6:
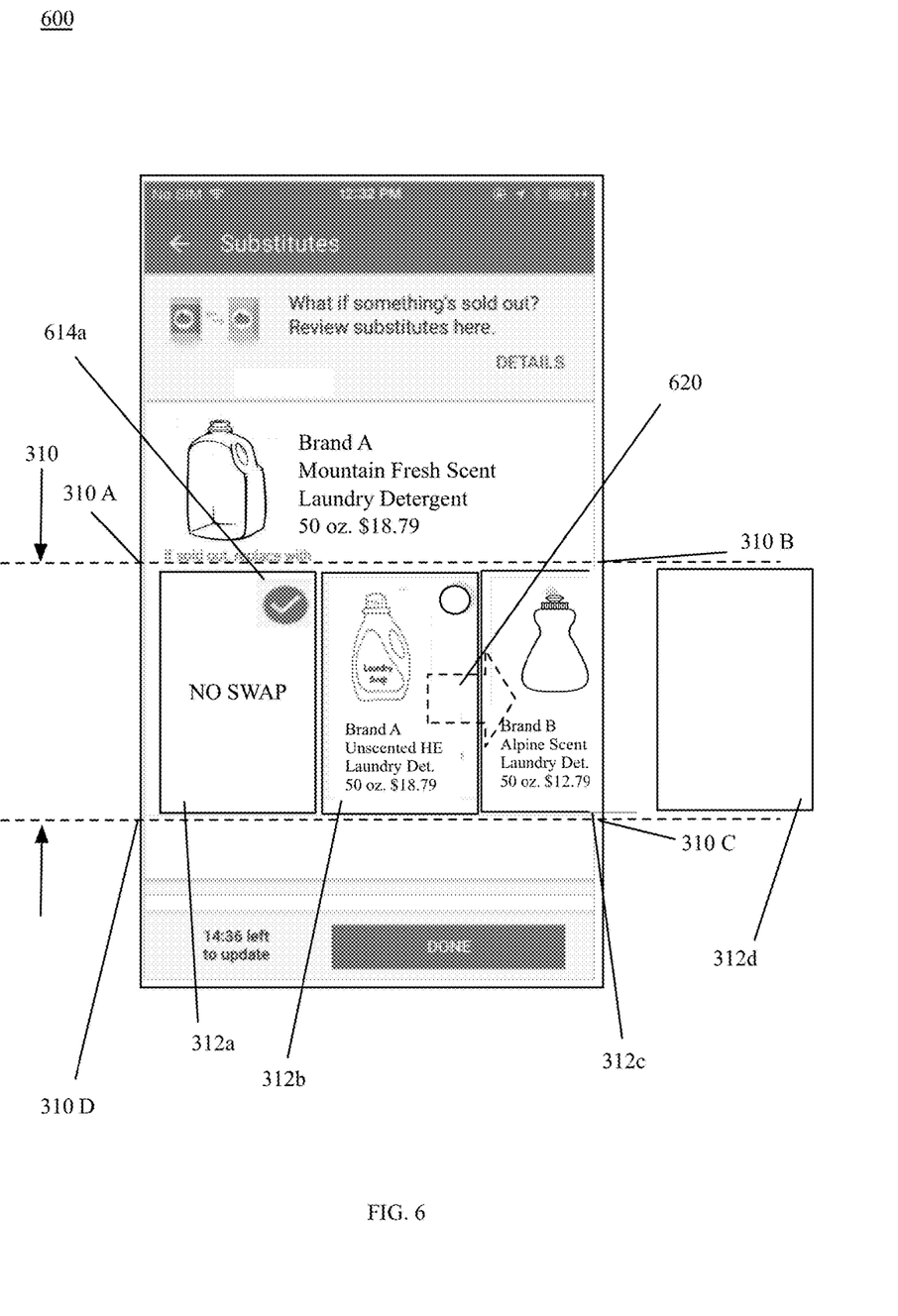
FIG. 6 is a notional UI for a carousel user interface, in accordance with certain example embodiments.

Referring to FIG. 6, while continuing to refer to prior figures for context, a carousel user interface 600 appropriate to a smartphone 110 is shown, in accordance with example embodiments of the present invention. In such embodiments, the carousel 310 is navigable horizontally. In the continuing example, a right swipe 620 performed on the carousel region 310 ABCD of the UI 600 of the mobile computing device 110 moves frame 312a into carousel region 310 ABCD, moves each of frame 312b and 312c one frame position to the right—thus moving the selection icon (not shown) for frame 312c out of the carousel region 310 ABCD. Note that frame 312d was moved entirely out of the carousel region 310 ABCD as a result of the right swipe 620.

In some embodiments of the present technology, at least one frame in the multiple selectable frames comprises content indicating that none of the second items are acceptable to the user as a swap for the first item. In the continuing example, frame 312a, shown as selected using checkmark 614a, indicates that no swap is acceptable to the consumer.

Figure 7:
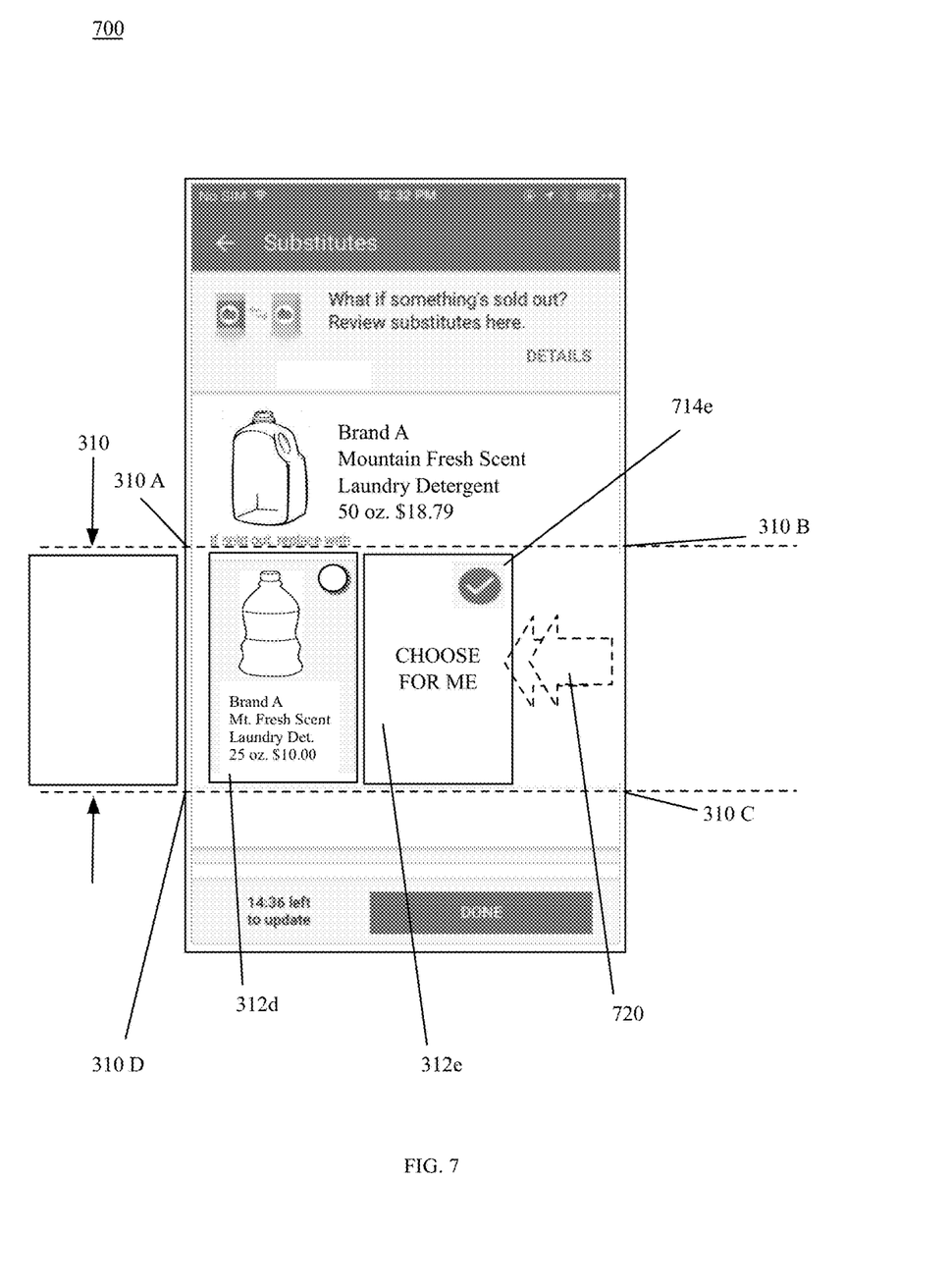
FIG. 7 is a notional UI for a carousel user interface, in accordance with example embodiments.

Referring to FIG. 7, while continuing to refer to prior figures for context, a carousel user interface 700 appropriate to a smartphone 110 is shown, in accordance with example embodiments of the present invention. In such embodiments, at least one frame in the multiple selectable frames comprises content indicating that automated selection of a swappable item is acceptable to the user. In the continuing example, the carousel region 310 ABCD of the UI 700 has received two (2) left horizontal swipes 720. UI frames 312b 312c have been moved out of the carousel region 310 ABCD to the left, UI frame 312d has been moved to the left-most frame position of the carousel region 310 ABCD, and frame 312e has been exposed to reveal a frame comprising content indicating that automated selection, "CHOOSE FOR ME," of a swappable item is acceptable to the consumer. In this case, the smartphone 110 has received selection of the "CHOOSE FOR ME" option as indicated by the checkmark 714e.

Figure 8:
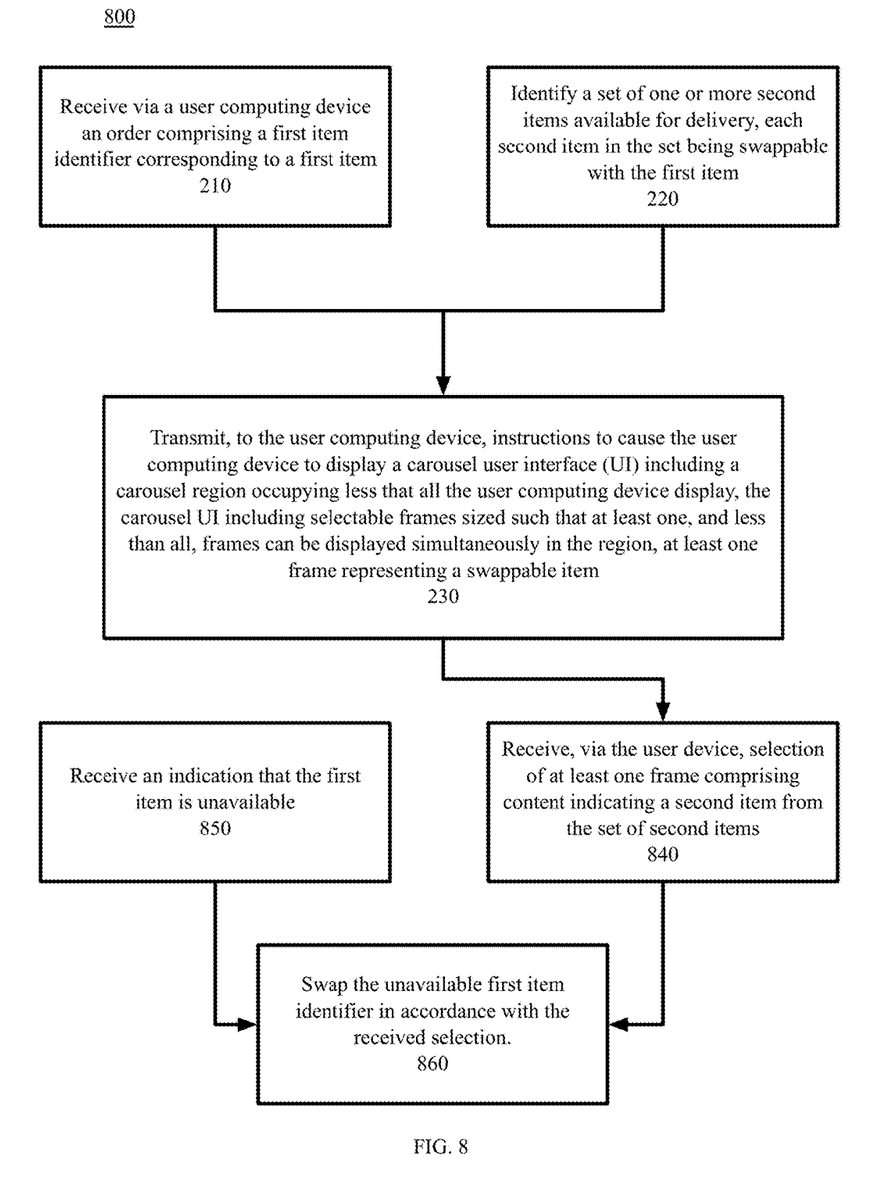
FIG. 8 is a block flow diagram depicting methods to operate a user interface (UI) in a local near term delivery online shopping system, in accordance with certain example embodiments.

Referring to FIG. 8, while continuing to refer to prior figures for context, example methods 800 to operate a UI for swappable item options are shown, in accordance with embodiments of the present technology. In such embodiments, Block 210—Block 230 are performed as described elsewhere herein. In such embodiments, selection of at least one frame comprising content indicating one second item from the set of second items available for delivery that are swappable is received via the user device—Block 840. In the continuing example, after selecting the frame 312c corresponding to the 50 oz. package of Brand B Alpine Scent laundry detergent, the consumer selected the "DONE" radio button 316.

In such embodiments, an indication that the first item is unavailable is received—Block 850. In the continuing example, a courier arrives at a primary inventory site, for example, a grocery store, to fulfill the consumer's order and determines that the 50 oz. package of Brand A Mountain Fresh Scent laundry detergent is out of stock. The courier updates the online shopping system 130.

Note that Block 840 and Block 850 can be performed in the opposite order. For example, the technology can solicit and receive the consumer's swap preference(s) before receiving a determination that the first item is unavailable.

The online shopping system swaps the unavailable first item identifier in accordance with the received selection—Block 860. In the continuing example, the online shopping system 130 swaps out the 50 oz. package of Brand A Mountain Fresh Scent laundry detergent in the order in favor of the 50 oz. package of Brand B Alpine Scent laundry detergent. The courier, or other order picker, can see this change in the order, and then continue with order fulfillment using the swapped selection. In some embodiments, the online shopping system notifies the courier or other order picker of the swap. The order picker can include an automated order picker.

Figure 9:
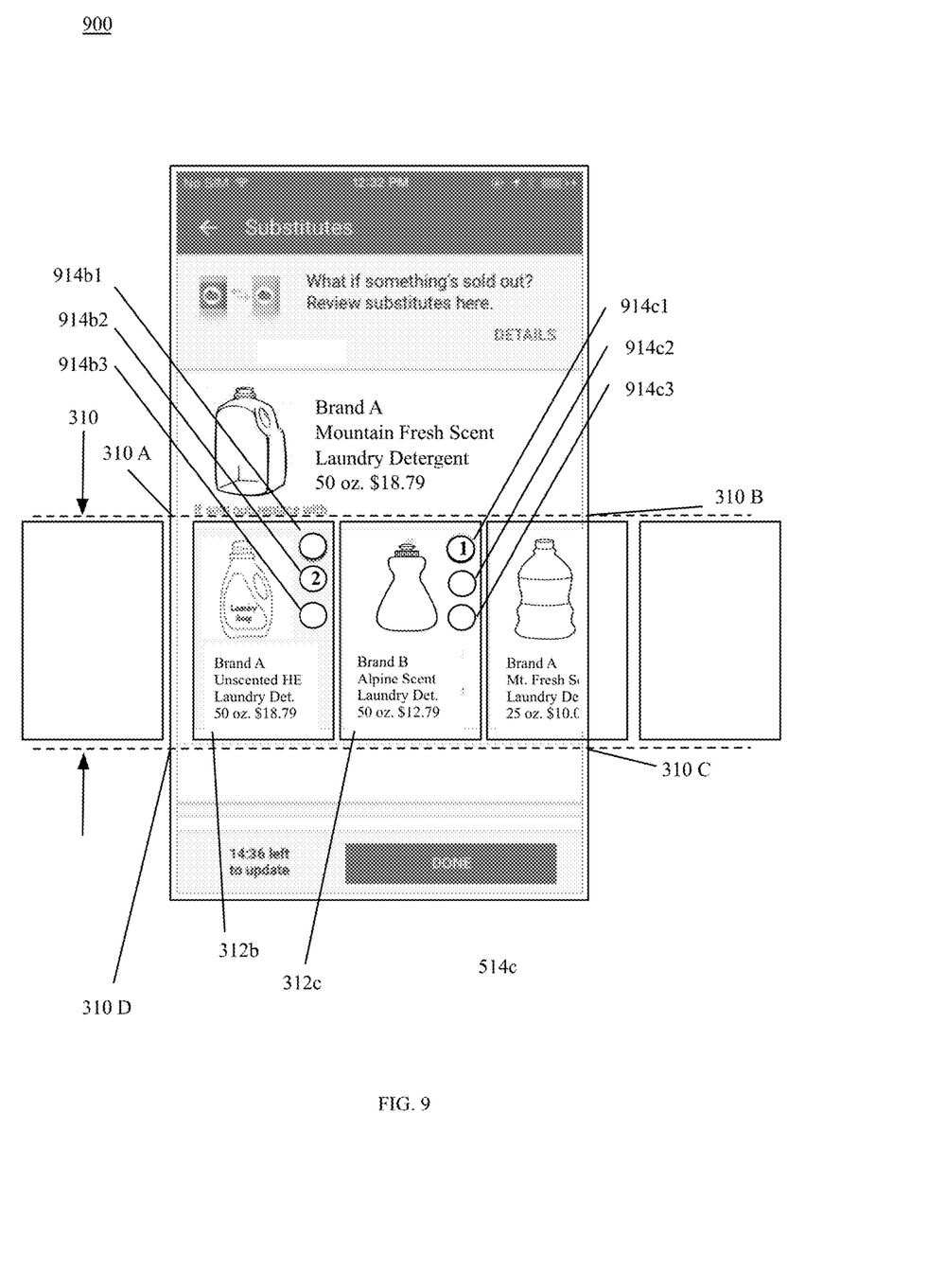
FIG. 9 is a notional UI for a carousel user interface, in accordance with certain example embodiments.

In some embodiments of the present technology, at least two frames in the swap options UI offer an opportunity for the consumer to select more than one swap option preference concurrently. For example, both frames 312b and 312c can be selected. In such a case, the final selection can be left to the online shopping system 130, the courier, or the manager of the inventory site. In some embodiments, such as embodiments shown in FIG. 9, an item swap options UI 900 can accept prioritized selection of item swap options. In FIG. 9, frames 312b and 312c each include three frame selection icons, {914b1, 914b2, 914b3} and {914c1, 914c2, 914c3}, respectively. The 50 oz. package of Brand B Alpine Scent laundry detergent is show selected as the first swap option by the "1" shown in selection icon 914c1. The 50 oz. package of Brand A Unscented HE laundry detergent is shown selected as the second swap option, to be used if both the first item and first swap option are unavailable, by the "2" shown in selection icon 914b2. In some embodiments, the UI 900 can accept user input of a priority number into the frame of the carousel region 310 ABCD. In some embodiments, the top selection, for example 914c1, can correspond to "1", and graphically lower selections can correspond to "2," etc., in order. In some embodiments, selection of a frame as the nth priority does not deselect other frames as other than the nth priority, but selection of a frame as the nth priority deselects a frame previously selected as the nth priority. In some embodiments, selection of a frame as the nth priority moves each frame selected as the nth priority and beyond down one level in priority if required to make room for the nth priority selection.

In some embodiments, the selection mechanism for either one or both of the "no swap" and "automatic swap" can be included in choosing prioritized swap options. For example, the UI 900 can accept frame 312c as swap priority 1 using 914c1, and "no swap" as priority 2 using a similar UI mechanism. In some embodiments, the selection mechanism for either one or both of the "no swap" and "automatic swap" can be included in the UI outside of the carousel.

Other Example Embodiments

FIG. 10 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software item. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device, for example, a system on chip (SOC), system on package (SOP), or ASIC device.

In situations in which the technology discussed here collects personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (for example, to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A computer-implemented method to operate a graphical user interface for swappable item options, comprising:
   providing, by operation of a computer, instructions causing a user computing device to present a carousel graphical user interface wherein:
   the carousel graphical user interface comprises a carousel region occupying less than all the display area of the user computing device and comprising a plurality of frames;
   each frame is sized such that at least one, and less than all, of the frames in the plurality of frames are displayed simultaneously in the carousel region,
   each frame is operable to receive selection of the frame via an input to the carousel graphical user interface of the user computing device,
   at least one frame comprises content indicating an item from a set of one or more second items available for delivery, each second item in the set being swappable with a first item corresponding to a first item identifier of an order; and the carousel region is navigable via user input to the graphical user interface to display each frame in the plurality of frames.

2. The method of claim 1, wherein:
selection of a frame via the graphical user interface of the user computing device indicates that the item corresponding to the content of the selected frame is acceptable to the user as a swap for the first item; and
selection of a frame via graphical user interface of the user computing device does not cause navigation of the user computing device away from a view containing the selected frame.

3. The method of claim 1, wherein selection of a frame via the graphical user interface of the user computing device deselects each other frame in the plurality of selectable frames.

4. The method of claim 1, wherein at least one frame in the plurality of selectable frames comprises content indicating that none of the set of second items is acceptable to the user as a swap for the first item.

5. The method of claim 1, wherein at least one frame in the plurality of selectable frames comprises content indicating that automated selection of a swappable item is acceptable to the user.

6. The method of claim 1, wherein the carousel region is navigable horizontally.

7. The method of claim 1, further comprising:
receiving, by the one or more computing devices, an indication that the first item is unavailable;
receiving, by the one or more computing devices, via the graphical user interface of the user device, selection of at least one frame comprising content indicating one second item from the set of second items available for delivery that are swappable; and
swapping, by the one or more computing devices, the unavailable first item identifier in the order in accordance with the received selection.

8. The method of claim 1, wherein:
the at least one frame comprising content indicating an item from the set of one or more second items is available for delivery comprises a plurality of frames comprising content indicating an item from the set of one or more second items is available for delivery; and
each of the plurality of frames comprising content indicating an item from the set of one or more second items is available for delivery comprises at least one priority icon operable to accept user input via the carousel graphical user interface indicating a priority of the item indicated by the frame.

9. The method of claim 8, wherein:
input indicating a particular priority of an item indicated by a particular frame lowers the priority of each other item previously indicated at the particular priority or lower by one priority position.

10. A computer program product, comprising:
a non-transitory computer-readable storage device having computer-executable program instructions embodied thereon that when executed by a computer cause the computer to operate a graphical user interface for swappable item options, the computer-executable program instructions comprising:
computer-executable program instructions to receive, by one or more computing devices via a user device, an order comprising an item identifier corresponding to a first item;
computer-executable program instructions to identify, by the one or more computing devices, a set of one or more items, each item in the set being swappable with the first item; and
computer-executable program instructions to transmit, by the one or more computing devices to the user device, instructions operable, when executed by the user device, to cause the user device to display a carousel graphical user interface;
wherein:
the carousel graphical user interface comprises a carousel region occupying less than all the display area of the user device and a plurality of frames,
each frame is sized such that at least one, and less than all, of the frames in the plurality of frames can be displayed simultaneously in the carousel region,
each frame is operable to receive selection of the frame via the user device,
at least one frame comprises content indicating an item from the set of one or more items; and
the carousel region is navigable via user input to display each frame in the plurality of frames.

11. The computer program product of claim 10, wherein:
selection of a frame via the graphical user interface indicates that the item corresponding to the content of the selected frame is acceptable to the user as a swap for the item corresponding to the received item identifier, and
selection of a frame via the graphical user interface does not cause navigation of the user device away from a view containing the selected frame.

12. The computer program product of claim 10, wherein selection of a frame via the graphical user interface deselects each other frame in the plurality of selectable frames.

13. The computer program product of claim 10, wherein at least one frame comprises content indicating that none of the set of second items is acceptable to the user.

14. The computer program product of claim 10, wherein at least one frame comprises content indicating that automated selection of a swappable item is acceptable to the user.

15. The computer program product of claim 10:
wherein the computer executable program instructions comprise:
determining, by the one or more computing devices, an availability for delivery of the first item;
receiving, by the one or more computing devices, via the user device, selection via the graphical user interface of at least one frame comprising content indicating one of an item from the set of items available for delivery that are swappable; and
swapping, by the one or more computing devices, the received item identifier in accordance with the received selection; and
wherein identifying a set of one or more items available for delivery is performed in response to determining that the item corresponding to the item identifier is unavailable for delivery.

16. A system to operate a graphical user interface for swappable item options comprising:
a storage device; and
a processor communicatively coupled to the storage device, wherein the processor executes application code instructions that are stored in the storage device to cause the system to provide, by operation of a computer, instructions causing a user computing device to present a carousel graphical user interface wherein:

the carousel graphical user interface comprises a carousel region occupying less than all the display area of the user computing device and comprising a plurality of frames;

each frame is sized such that at least one, and less than all, of the frames in the plurality of frames are displayed simultaneously in the carousel region, each frame is operable to receive selection of the frame via an input to the carousel graphical user interface of the user computing device, at least one frame comprises content indicating an item from a set of one or more second items available for delivery, each second item in the set being swappable with a first item corresponding to a first item identifier of an order; and the carousel region is navigable via user input to the graphical user interface to display each frame in the plurality of frames.

17. The system of claim 16, wherein:

selection of a frame via the graphical user interface indicates that the item corresponding to the content of the selected frame is acceptable to the user as a swap for the item corresponding to the received item identifier, and selection of a frame via the graphical user interface does not cause navigation of the user device away from a view containing the selected frame.

18. The system of claim 16, wherein selection of a frame via the graphical user interface deselects each other frame in the plurality of selectable frames.

19. The system of claim 16, wherein at least one frame comprises content indicating that none of the set of second items is acceptable to the user.

20. The system of claim 16, wherein at least one frame comprises content indicating that automated selection of a swappable item is acceptable to the user.

\* \* \* \* \*